United States Patent [19]

Snellman

[11] Patent Number: 4,776,069

[45] Date of Patent: Oct. 11, 1988

[54] PISTON-GLIDE SHOE COMBINATION IN A VARIABLE-CROWN ROLL

[75] Inventor: Jorma Snellman, Karlstad, Sweden

[73] Assignee: Valmet Oy, Finland

[21] Appl. No.: 56,109

[22] Filed: May 29, 1987

[30] Foreign Application Priority Data

May 30, 1986 [FI] Finland .................. 862317

[51] Int. Cl.$^4$ .............................................. B21B 27/00
[52] U.S. Cl. ........................... 29/116.1 R; 29/113.1; 29/116.2; 100/162 B
[58] Field of Search ......... 29/116 R, 116 AD, 113 R; 100/93 RP, 162 B, 163 A, 153; 162/357

[56] References Cited

U.S. PATENT DOCUMENTS

| | | | |
|---|---|---|---|
| 3,802,044 | 4/1974 | Spillmann et al. | 29/116 AD |
| 3,846,883 | 11/1974 | Biondetti | 29/116 AD |
| 4,186,472 | 2/1980 | Biondetti | 29/116 AD |
| 4,373,238 | 2/1983 | Güttinger | 29/113 AD |
| 4,661,206 | 4/1987 | Heitmann et al. | 29/116 AD |
| 4,705,602 | 11/1987 | Dahl | 29/116 AD |

FOREIGN PATENT DOCUMENTS

3001487  8/1980  Fed. Rep. of Germany ........ 29/116 AD

Primary Examiner—Howard N. Goldberg
Assistant Examiner—Irene Cuda
Attorney, Agent, or Firm—Steinberg & Raskin

[57] ABSTRACT

A piston-glide shoe combination for use in a zone-adjustable variable-crown roll comprising a stationary central axle and a cylindrical roll mantle rotatably mounted on the central axle, the glide shoes of the combinations being loaded by hydraulic fluid pressure against the inner surface of the roll mantle so as to control the distribution of nip pressure in a nip formed by the variable-crown roll and a counter-roll. The piston-glide shoe combination includes an auxiliary chamber arrangement into which the pressure fluid is passed from the lubrication chambers and/or glide surface regions of the glide shoe through ducts so that when the pressure in the lubrication chambers and/or on the glide surface regions of the glide shoe is reduced, the reduced pressure is transmitted through the duct to a particular auxiliary chamber or chambers so that a torque tending to stabilize the play at the glide surface of the glide shoe that causes the reduced pressure.

25 Claims, 6 Drawing Sheets

PISTON-GLIDE SHOE COMBINATION IN A VARIABLE-CROWN ROLL

BACKGROUND OF THE INVENTION

The present invention relates to piston-glide shoe combinations for use in zone-adjustable variable-crown rolls.

A zone-adjustable variable-crown roll comprises a stationary central axle on which a cylindrical roll mantle is rotatably mounted. A series of piston-glide shoe combinations are generally situated between the axle and the inner surface of the roll mantle and are loaded by hydraulic pressure fluid so that the glide shoes are loaded against the inner surface of the roll mantle to control the distribution of the nip pressure in a nip formed by the variable-crown roll and a counter-roll.

Various constructions of variable-crown or adjustable-crown rolls of the type described above are known. Generally, the nips formed by such rolls, such as press nips or calendering nips, are loaded by means of loading forces applied to the axle journals of the variable-crown roll and of the counter-roll.

The present invention is directed to such variable-crown rolls that include a series of glide shoes whose glide surfaces act upon the inner surface of the roll mantle and which are at least partly hydrostatically lubricated by means of pressurized fluid passed onto the glide surface from lubricating chambers provided on the glide shoes.

Reference is made to Finnish Patents Nos. 46,278 of Beloit Corporation, 68,709 of Kleinewefers GmbH and 68,886 of JM Voith GmbH with regard to prior art related to the invention.

The components of variable crown rolls that support and load the inner surface of the roll mantle by means of pressurized fluid must fulfill many diverse functions. Components already known in the prior art are not capable of fulfilling all of the requirements at the same time. For example, some of the functions required of such loading components are as follows:

(1) the hydrostatic lubrication of the support or glide shoes as well as of the loading piston and cylinder must be well sealed even under the action of varying load forces and even where changes in the angle between the roll mantle and the stationary axle occur;

(2) the loading pistons of the glide shoes must be able to withstand lateral forces caused by friction;

(3) the loading equipment for the glide shoes must be capable of acting as an articulated joint since the relative positions of the roll mantle being supported and the central stationary axle with respect to each other varies to a considerable extent with varying load forces;

(4) the load pistons of the glide shoes must provide sufficiently large forces in the radial direction of the roll over a range that is sufficiently large in order to support and load the roll mantle;

(5) the thickness of the oil film that lubricates the glide surface of the glide shoes must be controllable; and (6) the bores provided in the central axle of the variable-crown roll in which the loading pistons are fitted must provide the pistons with a considerable range of radial movement.

As noted above, the known loading piston-glide shoe combinations which load and support the rotatable mantles of variable-crown rolls do not fulfill all of the requirements noted above.

SUMMARY OF THE INVENTION

The main object of the present invention is to provide new and improved piston-glide shoe combinations wherein the stability of the hydrostatically lubricated glide shoes is improved. In this connection, in known piston-glide shoe combinations, the stability of the glide shoes is based solely on the differences in pressure between the various lubrication chambers provided in the glide shoes. If a glide shoe is arranged on an articulated joint where a definite force must be applied to the glide shoe to pivot the same due to the friction inherent in such articulated joints, the pressure differences between the lubrication chambers may not be sufficient in all cases to pivot the glide shoe into such position that the differences in pressure between the lubrications chambers are equalized.

Another object of the present invention is to provide new and improved piston-glide shoe combinations in which the glide shoes can be freely positioned in all directions relative to the associated loading pistons.

Still another object of the present invention is to provide new and improved piston-glide shoe combinations wherein the glide shoe is pivotably supported with respect to a point that is relatively closely spaced to the lubricated glide surface of the glide shoe so that the moment applied to the glide shoe by the friction forces that arise at the glide surface and which causes the glide shoe to pivot is reduced to the extent possible.

A further object of the present invention is to provide new and improved piston-glide shoe combinations wherein the pressure fluid can be passed from the loading space of the loading pistons into the hydrostatic lubrication chambers of the glide shoes by means of a simple arrangement.

A still further object of the present invention is to provide new and improved loading piston-glide shoe combinations which avoid the drawbacks of conventional piston-glide shoe combinations and which fulfill all the required functions that are described above.

Briefly, in accordance with the present invention, these and other objects are attained by providing in a loading piston-glide shoe combination an auxiliary chamber arrangement comprising at least two auxiliary chambers into which the pressure fluid is passed from the lubrication chambers and/or glide surface regions of the glide shoe through ducts so that when the pressure in one of the lubrication chambers and/or on a region of the glide surface of the glide shoe is reduced, such reduction in pressure is transmitted through the duct to a particular auxiliary chamber or chambers whereupon a torque acting on the glide shoe is produced that tends to stabilize the glide shoe to reduce the leakage-causing play thereof.

Thus, in accordance with the invention, not only are the lubrication chambers of the glide shoe used to stabilize the glide shoes, but, additionally, auxiliary chambers are utilized which communicate with the lubrication chambers by way of ducts. When differences in pressure arise in the lubrication chambers on the glide shoe due to differences in leakage between the lubrication chambers, such pressure differences are transmitted to the auxiliary chambers which produce an additional moment which tends to pivot the glide shoe into a position such that the differences in pressure in the lubrication chambers of the glide shoe are eliminated, i.e., the pressures are equalized.

The pressure communication between the lubrication chambers and the auxiliary chambers is substantially unchoked so that substantially the same pressure prevails in communicating lubricating and auxiliary chambers. The pressure difference required for stabilization is provided by means of choking the flow of pressure fluid at the inlet side of the auxiliary chambers or lubrication chambers, depending on the particular route along which the pressure medium is passed into the glide shoe.

In accordance with the invention, the stabilizing force acting on the glide shoe that causes the stabilizing torque to act thereon may be either substantially parallel to the axial direction of the loading pistons, i.e., parallel to the radial plane of the variable-crown roll, or substantially paralled to the axis of the variable-crown roll, or even in a direction between them. The glide shoes can be mounted on their respective loading pistons in various ways and the invention is suitable for use in connection with glide shoes of all shapes.

It is possible to use four or more lubrication and auxiliary chambers in a piston-glide shoe combination in accordance with the invention in which case the stabilization of the glide shoe can be obtained with respect to orthogonal planes passing through the glide shoe. However, the invention may also be carried out with only two lubrication and auxiliary chambers in which case the glide shoe is stabilized with respect to only a single plane, preferably in the plane of the direction of rotation of the roll mantle, i.e., a plane transverse to the axis of rotation of the roll mantle. The invention can also be carried out in glide shoes provided with only a single lubrication chamber if the ducts intended for stabilization are opened into different regions of the glide surface of the glide shoe.

DESCRIPTION OF THE DRAWINGS

A more complete appreciation of the present invention and many of the attendant advantages thereof will be readily understood by reference to the following detailed description when considered in connection with the accompaning drawings in which.

DESCRIPTION OF THE PREFERRED EMBODIMENTS

Figure 1:
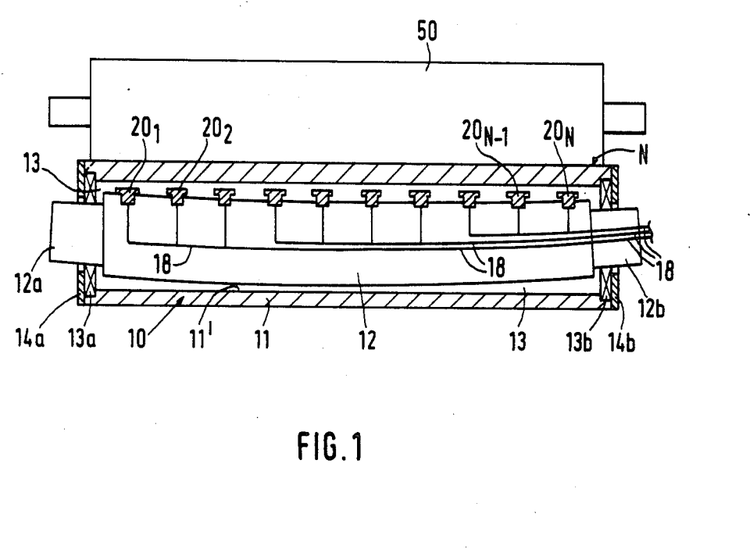
FIG. 1 is a schematic illustration in partial section of a zone-adjustable variable-crown roll in which piston-glide shoe combinations in accordance with the invention are used, shown forming a nip with a counter-roll.

Referring now to the drawings wherein like reference characters designate identical or corresponding parts throughout the several views, a zone-adjustable variable-crown roll of the type with which a piston-glide shoe combination in accordance with the invention is used and which is per se known, is illustrated in FIG. 1. The variable-crown roll 10 may be used, for example, as a press roll in a paper machine or as a calender roll. The roll 10 comprises a stationary central axle 12 on which a cylindrical mantle 11 is rotatably mounted on axle journals 12a and 12b comprising extensions of the axle 12 by means of bearings 13a and 13b. A free space 13 is defined between the inner surface 11' of the roll mantle 11 and the central axle 12. The mantle 11 is closed by end flanges 14a and 14b and is driven by means of a drive gear (not shown) as is conventional. A counter-roll 50 is situated against roll to form, for example, a press nip N. A series of loading piston-glide shoe combinations $20_1 \ldots 20_N$ in accordance with the invention are situated between the axle 12 and the inner surface 11' of mantle 11 by means of which the linear load in the nip N can be regulated and compensated in zone-by-zone fashion as desired. For example, the nip pressure can be regulated to provide a uniformly distributed linear load throughout the nip N.

Figure 2:
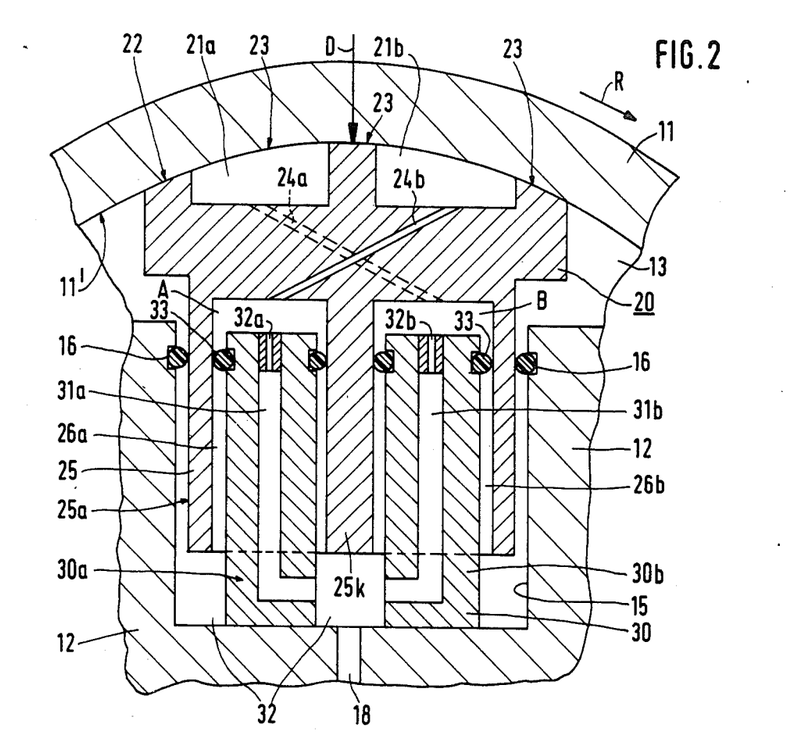
FIG. 2 is a section view taken along line II—II of FIG. 2A.
Figure 2A:
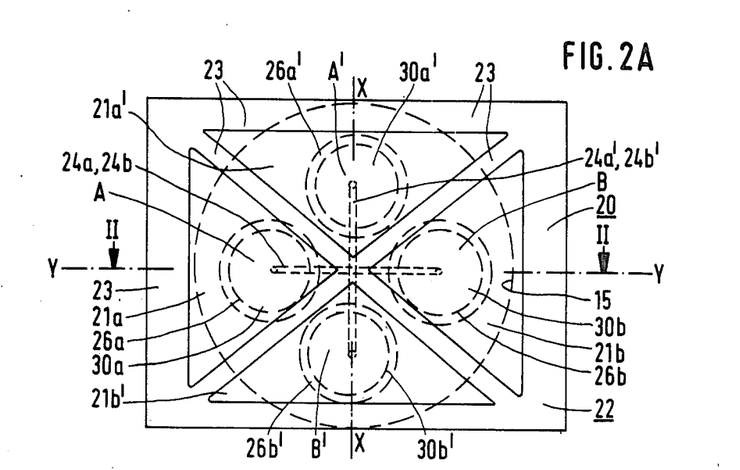
FIG. 2A is a view of a piston-glide shoe combination as viewed in the direction D indicated in FIG. 2.

Referring to FIGS. 2 and 2A in conjunction with FIG. 1, fluid under pressure is passed from an external source (not shown) through ducts 18 into the respective cylinders or bores 15 (FIG. 2) formed in axle 12 and in which the loading pistons 30 are situated. The pressures of the fluidsdirected through the various ducts 18 are independently adjustable. The piston-glide shoe combination comprises a loading piston 30 situated within a respective cylinder or bore 15 formed in the axle 12, and a glide shoe 20 associated with each loading piston 30. In the embodiment of FIG. 1, the glide shoes 20 are identical with each other and are situated as closely as possible to each other so that a substantially uniform load is provided on the inner surface 11' of the roll mantle 11 even where high compensaiton forces are required. Each of the glide shoes 20 in the illustrated embodiment has four hydrostatic lubrication chambers 21a, 21b, 21a' and 21b' between which are ridges 23 forming a lubricated glide surface 22 which acts against the smooth inner surface 11' of the mantle 11. Lubrication oil is passed into the hydrostatic lubrication chambers 21a, 21b, 21a' and 21b' from the loading pressure space 32 formed by the loading piston 30 and the axle bore 15 by way of an arrangement described in detail below.

As seen in FIG. 2, in each piston-glide shoe combination, the piston 30 is stationarily mounted in the axle bore 15. In the illustrated embodiment, the piston 30 comprises four auxiliary piston projections 30a, 30b, 30a' and 30b' of circular section. In a corresponding manner, the glide shoe 20 is provided with a projecting portion 25 in which four corresponding cavities 26a, 26b, 26a' and 26b' are formed, each cavity receiving a respective of the piston projections. The projecting portion 25 of glide shoe 20 is sealed in the axle bore 15 by means of a seal ring 16 in a manner so that the glide shoe 20 is moveable within the bore 15. The pressure space 32 remains between the projecting portion 25 of glide shoe 20 and the bottom of bore 15. Fluid under pressure is passed through the duct 18 into the pressure space 32 so that the loading pressure on the piston 30 is adjustable. Seal rings 33 are provided around the upper ends of the auxiliary piston projections which seal the projecting portion 25 of the glide shoe 20 against the inner surface of the cavities 26a, 26b, 26a' and 26b'. A central projection 25k extends from the glide shoe 20 between the cavities 26.

The upper ends of the auxiliary piston projections 30a, 30b, 30a' and 30b' and respective cavities 26a, 26b, 26a' and 26b' in which they are received define auxiliary chambers A, B, A' and B'. Each of the stationary auxiliary piston projections is provided with a duct, such as 31a and 31b in projections 30a and 30b as seen in FIG. 2, which communicate with respective auxiliary chambers and the loading pressure space 32. Pressure reducing means 32a, 32b are positioned within the ducts 31a and 31b for reducing the pressure of or choking the pressure fluid entering the auxiliary chambers from the pressure supply space 32. An oil duct 24b extends between the auxiliary chamber A and the lubrication chamber 21b and, similarly, an oil duct 24a extends between the lubrication chamber 21a and the auxiliary chamber B. By means of the ducts 24a and 24b, the lubrication chambers 21a and 21b on the glide shoe 20 are interconnected in a cross-wise fashion so that a stabilization in accordance with the invention is obtained as will be described below.

More particularly, in the illustrated embodiment, the glide shoe includes four separate lubrication chambers that communicate with four corresponding auxiliary chambers in a cross-wise fashion. Specifically, with respect to an axial plane X-X (FIG. 2A) that contains the axis of rotation of the roll mantle and that passes centrally through the piston-glide shoe combination, the glide shoe includes first and second lubrication chambers 21a and 21b situated on first and second sides of the axial plane X-X respectively while the piston-glide shoe combination includes first and second auxiliary chambers A and B situated on the first and second sides of the axial plane X-X. With respect to a transverse plane Y-Y (FIG. 2A) which is perpendicular to the axis of rotation of the roll mantle and which passes centrally through the piston-glide shoe combination, the glide shoe includes and third and fourth lubrication chambers 21a' and 21b' situated on first and second sides of the transverse plane Y-Y respectively while the piston-glide shoe combination includes third and fourth auxiliary chambers A' and B' situated on the first and second sides of the transverse plane Y-Y. A first duct 24a extends between the first lubrication chamber 21a and second auxiliary chamber B, second duct 24b extends between the second lubrication chamber 21b and first auxiliary chamber A, third duct 24a' extends between the third lubrication chamber 21a' and fourth auxiliary chamber B', and fourth duct 24b' extends between the fourth lubrication chamber 21b' and the third auxiliary chamber A'. In this manner, the lubrication chambers and auxiliary chambers are interconnected in a cross-wise fashion with respect to planes passing centrally through the piston-cylinder shoe combination.

The following description will be with reference to the stabilization of a glide shoe 20 in a plane parallel to the direction of rotation R of the roll mantle, i.e., in the transverse plane Y-Y, through the use of the lubrication chambers 21a and 21b and the corresponding auxiliary chambers A and B. It will be understood that the stabilization of the glide shoe in the axial plane (plane X-X) is in accordance with the same principles as will be described through the utilization of lubrication chambers 26a' and 26b' and auxiliary chambers A' and B'.

Assuming a difference in pressure between the lubrication chambers 21a and 21b on glide shoe 20, such as due to the inclination or play of the glide shoe 20 and resultant leakage at the glide surface 22, the difference in pressure produces a corresponding pressure difference in the auxiliary chambers A and B since there is no pressure reduction or choking in the bores 24a and 24b. However, on the other hand, there is pressure reduction or choking at the intake side of auxiliary chambers A and B, namely by way of pressure reducers 32a and 32b. The pressure differential between the lubrication chambers 21a and 21b are produced by fluid leakage that occurs at the glide surfaces 11' and 22 over the ridges 23. For example, referring to FIG. 2, if the largest leakage occurs in the leading (in the direction of rotation R) lubrication chamber 21a, and therefore the pressure in lubrication chamber 21a is lower than in the following lubrication chamber 21b, this pressure differential is transferred to the rear most auxiliary chamber B whereby the sealing pressure in the lubrication chamber 21b facing the auxiliary chamber B is lowered so that the difference in pressure between the lubrication chambers 21a and 21b is equalized.

In the illustrated embodiments, it is important in obtaining the stabilization in accordance with the invention that the ducts providing communication between the auxiliary chambers and the lubrication chambers do not cause any substantial reduction or choking in the pressur of the fluid medium. Such a pressure reduction or choking is, however, provided at the intake side of the auxiliary chambers as seen at 32a and 32b in FIG. 2.

Thus, the glide shoes 20 are in effect self-stabilized, both in the axial plane as well as in the transverse plane, and always seek a position wherein the lubrication pressures in the lubrication chambers are equal to each other.

Figure 3:
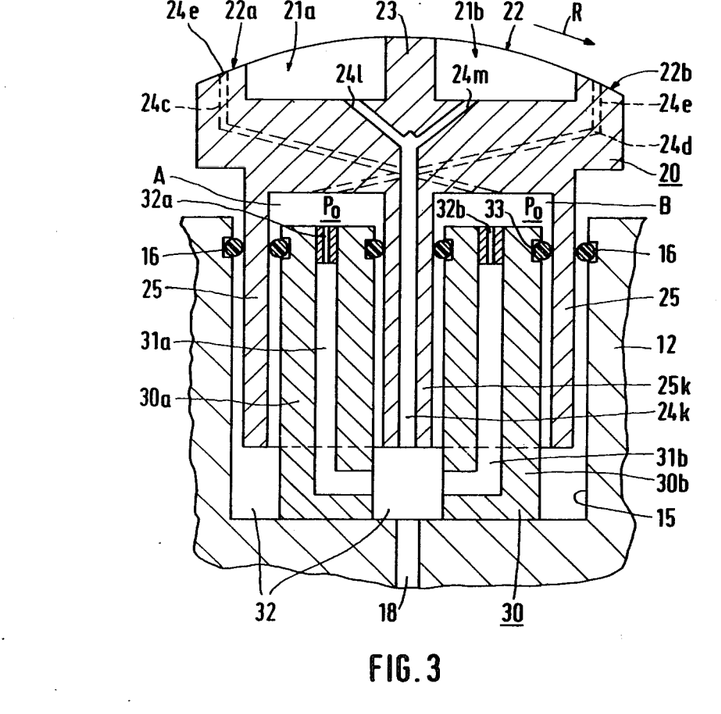
FIG. 3 is a view similar to FIG. 2 illustrating a second embodiment of a piston-glide shoe combination in accordance with the invention.

Referring now to FIG. 3, a stationary piston arrangement 30 fixed within the axle bore 15 is utilized which is similar to that of the FIG. 2 embodiment. According to the FIG. 3 embodiment, lubrication pressure is passed through a bore 24k in the central projection 25k in the projecting portion 25 of the glide shoe 20 into both of the lubrication chambers 21a and 21b through ducts 24l and 24m which communicate with bore 24k. Thus, the pressure in the lubrication chambers 21a and 21b is not adjustable. On the contrary, ducts 24c and 24d extend in crosswise fashion from the auxiliary chambers A and B to the regions 22b and 22a of the glide surface 22 of glide shoe 20, i.e., with the mouths of ducts 24c and 24d opening on the ridges 23. If the glide shoe 20 obtains a position such that the gap between the inner surface of the roll mantle and the glide surface region 22a is greater than the gap between the mantle inner surface and the glide surface region 22b, a reduced pressure is produced at the rearmost auxiliary chamber B and, in this manner a moment is produced which pivots the glide shoe 20 in the direction of rotation R causing the gap of the glide surface region 22a to become smaller while the pressure in auxiliary chamber B increases to the same level as in chamber A whereupon the glide shoe 20 becomes stabilized. The construction of the embodiment shown in FIG. 3 is in other respects similar to that described above with respect to the embodiment of FIG. 2.

Figure 4:
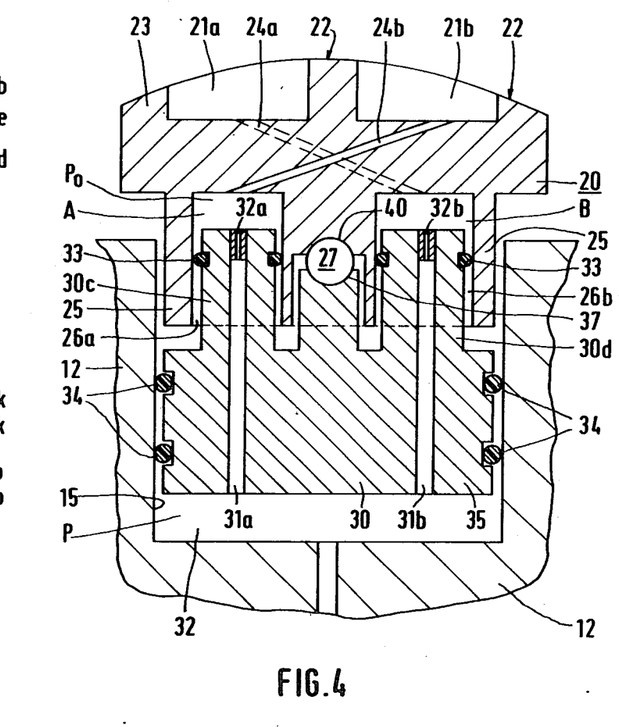
FIG. 4 is a view similar to FIGS. 2 and 3 illustrating a third embodiment of a piston-glide shoe combination in accordance with the invention.

Referring now to FIG. 4, an embodiment of a piston-glide shoe combination according to the invention is illustrated in which the piston is moveably situated in the axle bore 15 with sealing rings 34 engaging the surface of the axle bore. The glide shoe 20 is loaded by means of a pressure P of pressurized fluid that is passed into the pressure supply space 32. The piston 30 includes four auxiliary piston projections, only two of which, 30c and 30d, are shown, in a manner similar to the previously described embodiments. The auxiliary piston projections are received within and sealed against, by means of seal rings 33, corresponding cavities 26a and 26b in the projecting portion 25 of glide shoe 20. The auxiliary piston projections and corresponding cavities define auxiliary chambers A and B (and A' and B', not shown) similiar to those described above, from which pressure is passed through ducts 24a and 24b (and 24a' and 24b', not shown) into the lubrication chambers 21a and 21b (and 21a' and 21b', not shown). According to the FIG. 4 embodiment, the piston 30 and glide shoe 20 are supported against each other not only by means of the auxiliary chambers, but, additionally, by means of a support joint 27 that bears against a bearing surface 37 of piston 30 and the bearing surface 40 of glide shoe 20. The support joint 27 may comprise a ball joint or a cylindrical joint.

Figure 5:
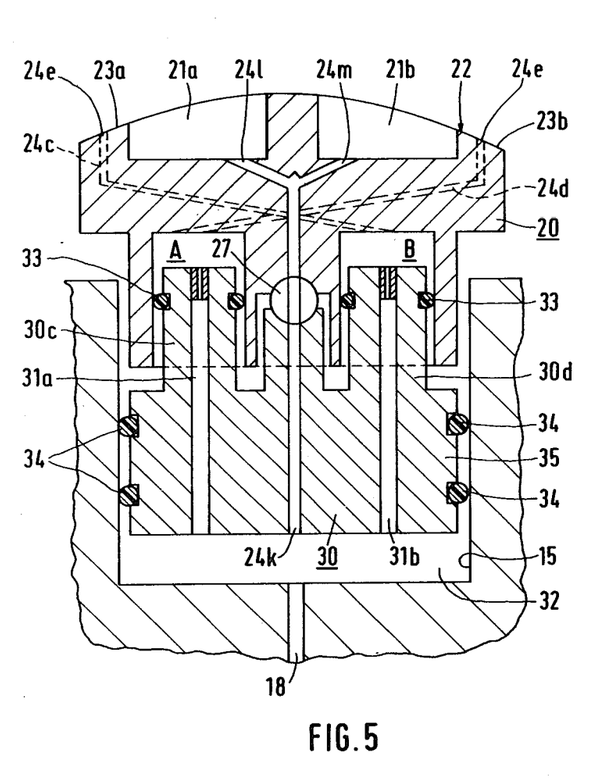
FIG. 5 is a view similar to FIGS. 2, 3 and 4 illustrating a fourth embodiment of a piston-glide shoe combination in accordance with the present invention.

Referring to FIG. 5, another embodiment of a piston-glide shoe combination in accordance with the invention is illustrated in which the piston 30 is moveably mounted within the axle bore 15 and sealed therein by means of sealing rings 34. An articulation bearing 27 is provided between the piston 30 and the glide shoe 20 through which the lubrication pressure is passed into the lubrication chambers 21a and 21b by means of duct 24k. In the FIG. 5 embodiment, the stabilization of the glide shoe is similar to that shown in FIG. 3 and the support between the glide shoe 20 and the loading piston is similar to that illustrated in FIG. 4.

Figure 6:
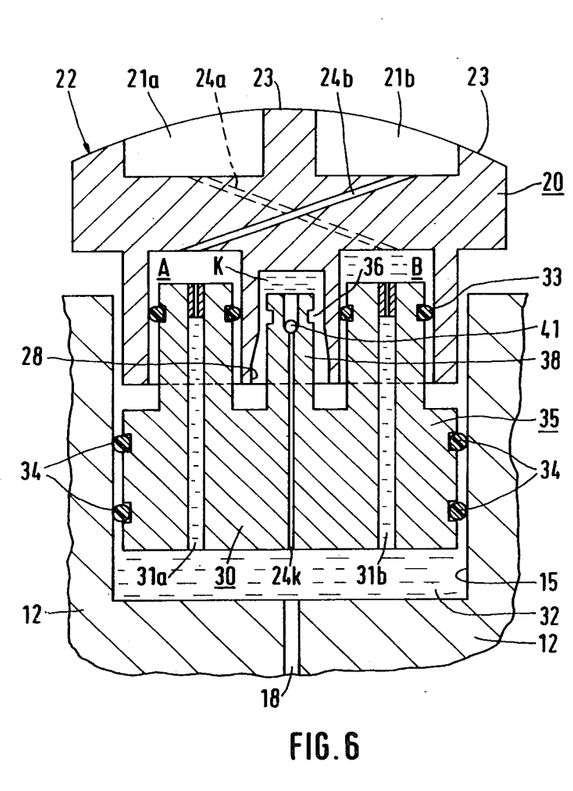
FIG. 6 is a view similar to FIGS. 2–5 showing a variation of the fourth embodiment of the invention illustrated in FIG. 5.

Referring now to FIG. 6, an embodiment of a piston-glide shoe combination is illustrated which is similar to that shown in FIG. 4 with the exception that the articulated joint 27 is replaced by a liquid cushion which is provided in a chamber K into which loading pressure is passed from the pressure fluid supply space 32 through a bore 24k and a one-way valve 41 that prevents a return flow from chamber K back to pressure fluid supply space 32. The loading piston 30 includes a central projecting portion 38 that is received within a corresponding cavity 28 of the glide shoe 20 to form the support chamber K. The chamber K is sealed by seal ring 36. The pressure prevailing in the chamber K is always at least equal to the pressure prevailing in the pressure supply space 32 and the pressure fluid forming a cushion in the chamber K carries a part of the load between the glide shoe 20 and the loading piston 30.

In each of the piston-glide shoe combination embodiments shown in FIGS. 2-6, the auxiliary chambers are defined by surface regions of the glide shoe which extend substantially perpendicular to the direction in which the glide shoe acts against the inner surface of the roll mantle so that the force producing the torque or moment on the glide shoe tending to stabilize the same is directed substantially parallel to the direction in which the glide shoe acts against the inner surface of the roll mantle, i.e., parallel to the radial plane of the variable-crown roll 10. The stabilization of the glide shoe of a piston-glide shoe combination in accordance with the invention can also be accomplished by means of a force of a different direction. Examples of such alternative embodiments are illustrated in FIGS. 7-10.

Figure 7:
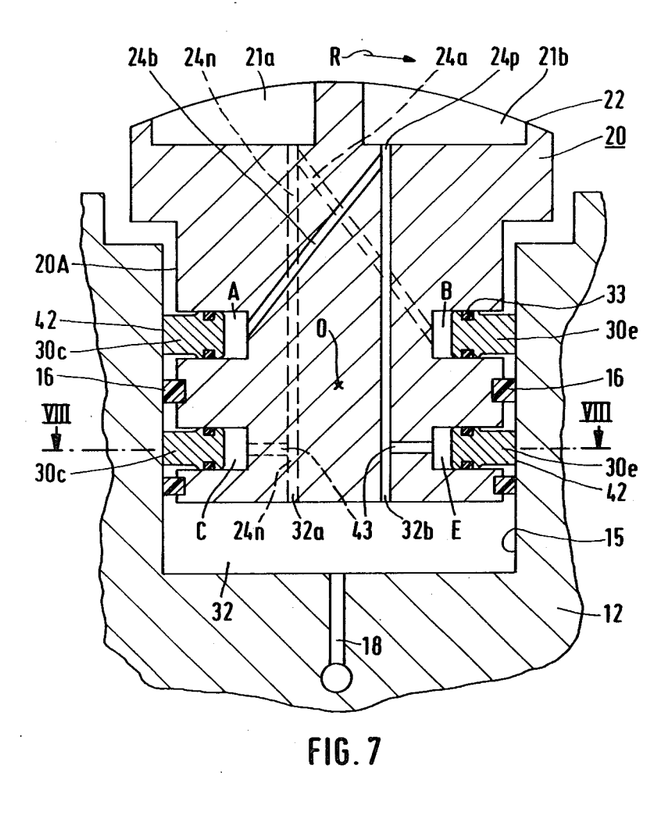
FIG. 7 is a view similar to FIGS. 2–6 and illustrating a fifth embodiment of a piston-glide shoe combination in accordance with the present invention.
Figure 8:
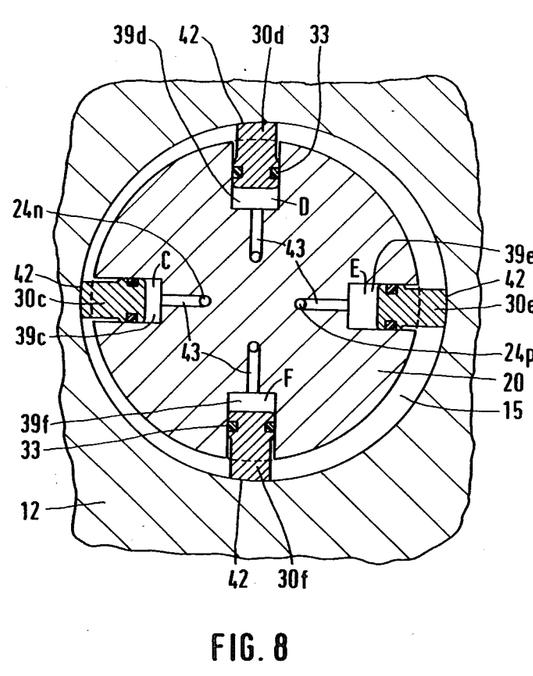
FIG. 8 is a section view taken along line VIII—VIII of FIG. 7.

Referring to FIGS. 7 and 8, an embodiment of a piston-glide shoe combination in accordance with the invention includes a glide shoe and loading piston that are formed of a unitary member 20 including a piston portion 20A sealed against the axle bore surface by a sealing ring 16. The auxiliary chambers are defined by upper and lower groups of cavities 39 in which corresponding auxiliary pistons 30 are fitted and sealed by seal rings 33. Each group of cavities include two sets of cavity pairs formed in the member 20, each set of cavities 39c, 39e being orthoganally offset from the other set of cavities 39d, 39f. Auxiliary pistons 30c, 30d, 30e and 30f are provided in the corresponding cavities so that a total of eight auxiliary chambers are provided.

The outer ends of the auxiliary pistons 30c-30f engage the surface of the axle bore 15. Opposed auxiliary chambers pairs C, E and D, F of the upper group are connected by means of ducts 24b and 24a to lubrication chambers 21a and 21b in a crosswise fashion while the lower auxiliary chambers are connected by means of ducts 24n and 24p to lubrication chambers 21a and 21b on the same side of a central plane. The opposite ends of the ducts 24n and 24p communicate with the loading pressure space 32 through pressure reducers 32a and 32b.

The pairs of auxiliary chambers A, C and B, E pivot the glide shoe 20 in a plane parallel to the direction of rotation R around a point O. For example, if the pressure in the lubrication chamber 21b is reduced, this reduction in pressure is transmitted through the duct 24b to the auxiliary chamber A so that the pressure therein is correspondingly reduced. In a similar manner, the pressure in lubrication chamber 21b is transmitted to the opposite lower auxiliary chamber E by means of ducts 24p and 43, whereas the pressure in the auxiliary chambers C and B remain at the level of the pressure in the lubrication chamber 21a. A moment or torque is produced in this manner that tends to pivot glide shoe 20 around the point O in a direction opposite to the direction of rotation R. It will be understood that in a corresponding manner, compensation for leakage will take place in the axial plane of the roll by means of pistons 30d and 30f and auxiliary chambers D and F (the upper auxiliary chambers are not shown in FIGS. 7 and 8).

Figure 9:
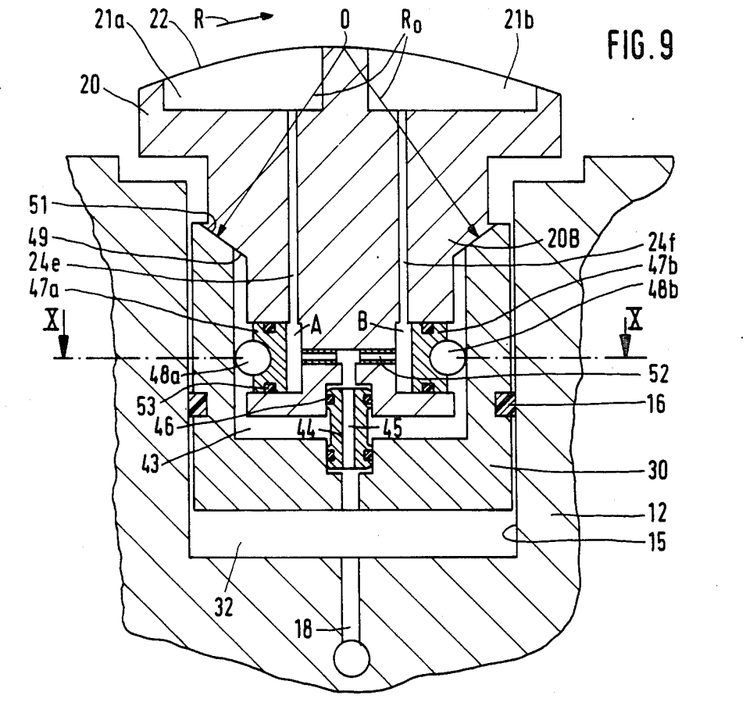
FIG. 9 is view similar to FIGS. 2–7 illustrating a sixth embodiment of a piston-glide shoe combination in accordance with the invention.
Figure 10:
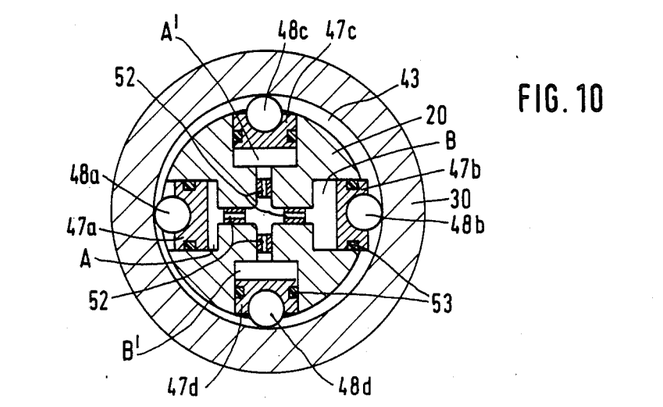
FIG. 10 is a section view taken along line X—X of FIG. 9.

Referring to FIGS. 9 and 10, another embodiment of a piston-glide shoe combination in accordance with the invention is illustrated wherein the glide shoe 20 is supported by means of a spherical segment surface 49 provided on a projecting portion 20B thereof against a spherical segment support surface 51 provided on piston 30. The radius of curvature of the spherical surfaces 49 and 51 is designated $R_0$ and the center of curvature is situated at a central region of the glide surface 22. The loading piston 30 has a cavity 43 formed therein which receives a projecting portion of the glide shoe 20. A sleeve-like articulated joint 44 interconnects the loading piston 30 and glide shoe 20.

The auxiliary chambers are defined by four radially extending cavities formed in the projecting portion of the glide shoe that open onto opposite sides thereof in which auxiliary pistons 47a, 47b, 47c and 47d are situated which engage against the inner surface of the cavity 43 provided in piston 30. The pistons 47 thus define auxiliary chambers A, B, A' and B' into which the pressure medium is passed by means of ducts 52, 24e and 24f. While the ducts that pass into the lubrication chambers 21a and 21b on glide shoe 20 are unrestricted, i.e., do not provide for any pressure reduction, the ducts 52 passing to the intake side the auxiliary chambers are provided with pressure reducers. The pressure medium is passed through the duct 18 into the loading pressure space 32 and onward through the duct 45 formed through joint 44 which sealingly interconnects the projecting portion 20b of glide shoe 20 and piston 30 by means of seals 46 into the radial ducts 52.

Stabilization of the glide shoe occurs around the center of curvature O of the spherical bearing surfaces 49, 51 so that, for example, if the pressure is reduced in the lubrication space 21a of glide shoe 20, it is also reduced in the auxiliary chamber A whereby the glide shoe tends to pivot around the center of curvature O in the direction of rotation R of roll mantle 11. In other respects, the stabilization of the support arrangement shown in FIGS. 9 and 10 is similar to that described above.

As mentioned above, if an arrangement such as shown in FIG. 3 is used, i.e., in which lubricant ducts, e.g., ducts 24c and 24d, are passed from the auxiliary chamber A and B in a crosswise fashion to the ridges 23a and 23b on glide surface 22, it is also possible to practice the invention by means of an arrangement in which only a single lubrication chamber 21 is provided or, alternatively, where several lubrication chambers are provided, wherein a constant pressure is passed into each lubrication chamber.

It will be understood that although the invention has been described in connection with hydrostatically lubricated glide shoes the invention can also be practiced using glide shoes in which only partial hydrodynamic lubrication is used, e.g., to glide shoes in which edge seals that produce a hydrodynamic dam pressure of the lubricant are provided, such as described in Finnish Application No. 860,644.

Obviously, numerous modifications and variations of the present invention ar possible in the light of the above teachings. It therefore to be understood that within the scope of the claims appended hereto, the invention may be practiced otherwise than as specifically disclosed herein.

What is claimed is:

1. In a zone-adjustable variable-crown roll comprising a stationary central axle and a cylindrical roll mantle rotatably mounted on said central axle, at least one piston-glide shoe combination arranged between said axle and said inner surface of said mantle, comprising:
    a loading piston fitted within a bore formed in said axle, said loading piston and bore defining a loading pressure space adapted to communicate with a source of fluid under pressure;
    a glide shoe associated with said loading piston including a glide surface and at least one lubrication chamber, said glide shoe adapted to be loaded by fluid pressure such that said glide surface acts against said inner surface of said mantle and is lubricated by the fluid passing onto said glide surface from said at least one lubrication chamber;
    an auxiliary chamber arrangement comprising at least two auxiliary chambers partially defined by said loading piston;
    duct means for providing fluid communication between at least one of said lubrication chambers and/or at least one region of said glide surface of said glide shoe and at least one respective auxiliary chamber so that when the pressure in said at least one lubrication chamber and/or on said at least one region of said glide surface of the glide shoe is reduced due to leakage at said glide surface caused by play in the position of said glide shoe, said pressure reduction is transmitted to said at least one respective auxiliary chamber,
    said auxiliary chambers being situated with respect to said glide shoe such that a pressure reduction in a respective auxiliary chamber causes a torque to be applied to said glide shoe tending to stabilize said glide shoe to reduce said leakage-causing play.

2. The combination of claim 1 wherein said duct means for providing fluid communication comprises a duct extending between at least one of said lubrication chambers and at least a respective one of said auxiliary chambers.

3. The combination of claim 1 wherein said duct means for providing fluid communication comprises a duct extending between said glide surface of said glide shoe and at least a respective one of said auxiliary chambers 4. The combination of claim 1 wherein with respect to an axial plane containing the axis of rotation of said roll mantle and passing centrally through said piston-glide shoe combination, said glide shoe includes first and second lubrication chambers situated on first and second sides of said axial plane respectively, and said piston-glide shoe combination includes first and second auxiliary chambers situated on said first and second sides of said axial plane respectively, and wherein said duct means include a first duct extending between said first lubrication chamber and said second auxiliary chamber, and a second duct extending between said second lubrication chamber and said first auxiliary chamber.

5. The combination of claim 1 wherein with respect to a transverse plane perpendicular to the axis of rotation of said roll mantle and passing centrally through said piston-glide shoe combination, said glide shoe includes first and second lubrication chambers situated on first and second sides of said transverse plane respectively, and said piston-glid shoe combination includes first and second auxiliary chambers situated on said first and second sides of said transverse plane respectively, and wherein said duct means include a first duct extending between said first lubrication chamber and said second auxiliary chamber, and a second duct extending between said second lubrication chamber and said first auxiliary chamber.

6. The combination of claim 1 wherein,
    with respect to an axial plane containing the axis of rotation of said roll mantle and passing centrally through said piston-glide shoe combination, said glide shoe includes first and second lubrication chambers situated on first and second sides of said axial plane respectively, and said piston-glide shoe combination includes first and second auxiliary chambers situated on said first and second sides of said axial plane respectively, and with respect to a transverse plane perpendicular to the axis of rotation of said roll mantle and passing centrally through said piston-glide shoe combination, said glide shoe includes third and fourth lubrication chambers situated on first and second sides of said transverse plane respectively, and said piston-glide shoe combination includes third and fourth auxiliary chambers situated on said first and second sides of said transverse plane respectively, and wherein said duct means include a first duct extending between said first lubrication chamber and said second auxiliary chamber, a second duct extending between said second lubrication chamber and said first auxiliary chamber a third duct extending between third lubrication chamber and said fourth auxiliary chamber, and a fourth duct extending between said fourth lubrication chamber and said third auxiliary chamber.

7. The combination of claim 1 wherein in a piston-glide shoe combination, said piston is stationarily mounted in said axle bore and comprises an arrangement of at least two piston projections, said glide shoe includes at least two corresponding cavities, each cavity receiving a respective one of said piston projections, each piston projection and corresponding cavity in which it is received forming a respective auxiliary chamber, and wherein said duct means fluidly communicates said auxiliary chambers and said lubrication chambers in a cross-wise fashion with respect to a plane passing centrally through said piston-glide shoe combination.

8. The combination of claim 1 wherein in a piston-glide shoe combination, said loading piston is mounted for movement in said axle bore under loading by fluid under pressure and wherein said duct means fluidly communicates said auxiliary chambers and said lubrication chambers in a cross-wise fashion with respect to a plane passing centrally through said piston-glide shoe combination.

9. The combination of claim 1 wherein in a piston-glide shoe combination, means communicating with said loading pressure space for reducing the pressure of said pressure fluid and for transmitting said pressure fluid at said reduced pressure to said auxiliary chambers.

10. The combination of claim 1 wherein, in a piston-glide shoe combination, a support joint for interconnecting said loading piston and said glide shoe.

11. The combination of claim 10 wherein said support joint comprises a ball joint.

12. The combination of claim 10 wherein said support joint comprises a cylindrical joint.

13. The combination of claim 1 wherein in a piston-glide shoe combination, said loading piston includes a central projecting portion, said glide shoe includes a cavity receiving said central projecting portion of said piston, said central projecting portion of said loading piston and said cavity defining a support chamber, a fluid passage extending between said loading pressure space and said chamber, whereby said support chamber receives pressure fluid which forms a cushion for carrying a part of the load between said glide shoe and said loading piston.

14. The combination of claim 13 wherein one-way valve means are provided in said duct means for preventing return flow of pressure fluid from said support chamber to said loading pressure space.

15. The combination of claim 1 wherein in a piston-glide shoe combination, said auxiliary chambers are defined by surface regions of said glide shoe which extend substantially perpendicularly to the direction in which said glide shoe acts against said inner surface of said roll mantle so that a force producing said torque on said glide shoe is directed substantially parallely to the direction in which said glide shoe acts against said inner surface of said roll mantle.

16. The combination of claim 1 wherein in a piston-glide shoe combination, a force producing said torque on said glide shoe is directed substantially perpendicularly to the direction in which said glide shoe acts against said inner surface of said roll mantle.

17. The combination of claim 1 wherein in a piston-glide shoe combination, said loading piston and glide shoe are formed of a unitary member, and wherein said auxiliary chambers are defined by at least two cavities formed in said member opening onto opposite sides thereof and at least two corresponding auxiliary pistons, each situated in a respective one of said cavities.

18. The combination of claim 17 wherein said auxiliary chambers are defined by at least two sets of cavity pairs formed in said members, each set of cavities being orthogonally offset from the other set of cavities and including two cavities opening onto opposite sides of said member, and at least four corresponding auxiliary pistons, each situated in a respective one of said cavities, and wherein said duct means fluidly communicate said auxiliary chambers and said lubrication chambers and/or said glide surface regions.

19. The combination of claim 17 wherein said duct means fluidly communicate said auxiliary chambers and said lubricating chambers in a cross-wise fashion with respect to plane passing centrally through said piston-glide shoe combination.

20. The combination of claim 1 wherein in a piston-glide shoe combination, said loading piston has a cavity formed therein, said glide shoe has a projecting portion extending inside said cavity, and an articulated joint interconnecting said loading piston and said glide shoe, said auxiliary chambers being defined by at least two chamber cavities formed in said projecting portion of said glid shoe and opening onto opposite sides thereof and at least two auxiliary pistons, each moveably received in a respective one of said chamber cavities adapted to be urged against a surface of said piston cavity.

21. The combination of claim 20 wherein said duct means fluidly communicate said auxiliary chambers and said lubrication chambers and/or said glide surface regions through substantially unchoked ducts and wherein fluid passage means extend between said auxiliary chambers and said loading pressure space, and pressure reducing means situated in said fluid passage means.

22. The combination of claim 21 wherein said fluid passage means pass through said articulated joint.

23. The combination of claim 20 wherein said projecting portion of said glide shoe and said loading piston have cooperating spherical segment bearing surfaces, said glide shoe adapted to pivot about center a curvature of said spherical segment bearing surfaces.

24. The combination of claim 23 wherein said center of curvature is situated substantially at a central region of said glide surface of said glide shoe.

25. The combination of claim 20 wherein said auxiliary pistons include rolling elements adapted to be urged against said surface of said loading piston cavity.

* * * * *